United States Patent
Montalto

(10) Patent No.: US 6,192,787 B1
(45) Date of Patent: *Feb. 27, 2001

(54) ELECTRICALLY HEATED BEVERAGE APPLIANCE

(75) Inventor: Bartolino Paul Montalto, 72 Hillsdale St., Boston, MA (US) 02124-5716

(73) Assignee: Bartolino Paul Montalto, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,218

(22) Filed: Nov. 3, 1997

(51) Int. Cl.[7] ............................... H05B 1/02; H05B 3/14; A47J 36/24

(52) U.S. Cl. ........................... 99/323.3; 99/275; 219/430; 219/432

(58) Field of Search .................................. 99/275, 323.3; 219/430, 432

(56) References Cited

U.S. PATENT DOCUMENTS

| 1,062,344 | * | 5/1913 | Mann | 219/432 |
| 4,463,664 | * | 8/1984 | Peace | 99/323.3 |
| 4,523,083 | * | 6/1985 | Hamilton | 219/433 |
| 5,283,420 | * | 2/1994 | Montalto | 219/432 |

* cited by examiner

Primary Examiner—Reginald L. Alexander

(57) ABSTRACT

A beverage warming device for collecting, temporarily storing, and thermally maintaining an elevated level of a hot beverage which includes a heated drinking container and a mating holding structure for holding the heated drinking container and connecting it to an electrical power source.

13 Claims, 2 Drawing Sheets

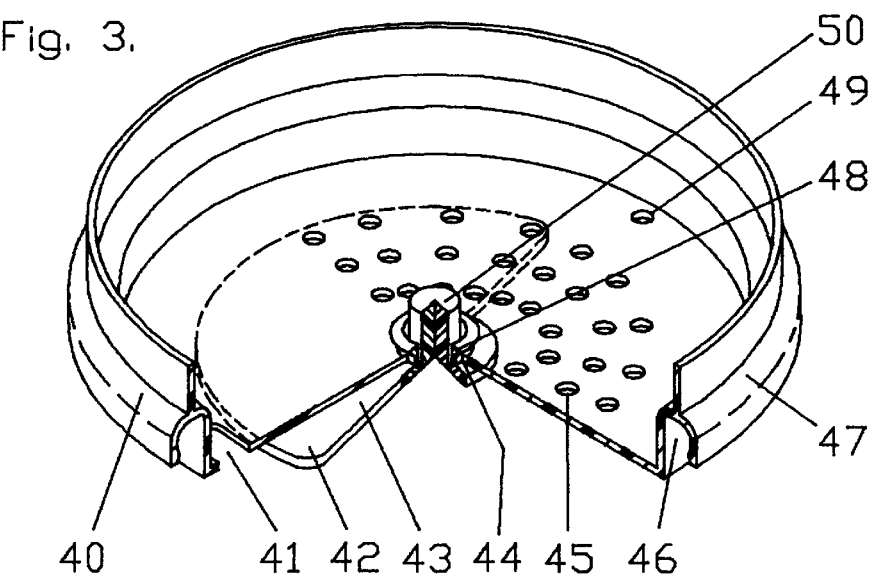
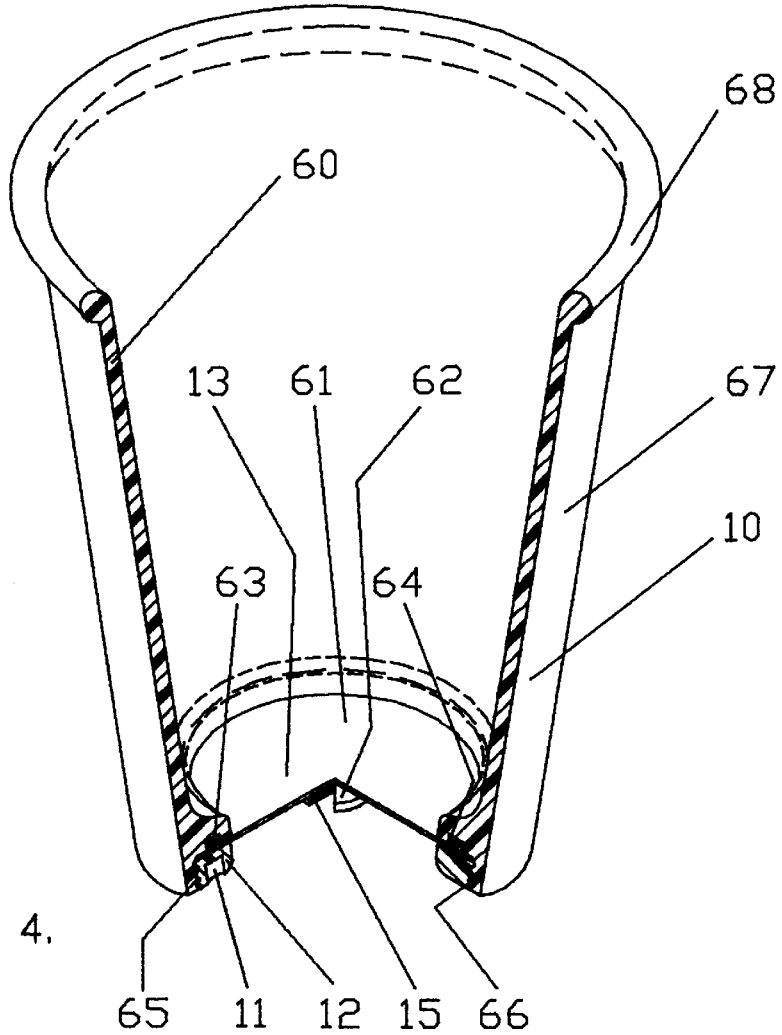

ELECTRICALLY HEATED BEVERAGE APPLIANCE

BACKGROUND OF THE INVENTION

1. Technical Field of the Invention

The invention relates generally to a device that thermally maintains an elevated level of a hot beverage.

2. Background Art

People often consume hot drinks such as coffee when driving to their destinations. Time spent in traffic delays and traveling long distances, for example, turns an enjoyable hot drink into a cold distasteful liquid. Heat from the beverage transfers quickly to the ambient surroundings.

Prior art devices include insulated beverage receptacles and hot plates or warmers. Insulated receptacles simply prolong the heat dissipation process. They can elongate the period in which the user considers the beverage enjoyable, but cannot maintain an elevated beverage temperature. Hot plates introduce some heat into the beverage through the bottom area of certain receptacles. However, this hot plate type of heating does not evenly distribute heat throughout the beverage. The reason is very little receptacle surface area contacts the hot plate, therefore minimizing heat transfer through the receptacle to the beverage. Additionally, this type of heater limits the type of receptacle materials that one can place onto them. Certain plastics and other low melting temperature materials will deform or melt when they contact a hot plate. Finally, some problems with other heated beverage apparatus is their design complexity and manufacturing difficulties, lack of thermal adjustability and circuit protection, and poor stability in mobile applications, to mention a few. Therefore, a necessity exists in the art for a simple, electrically heated beverage appliance that thermally maintains an elevated level of a hot beverage contained therein.

SUMMARY OF THE INVENTION

This invention relates to an electrically heated beverage appliance consisting of a means for containing and thermally maintaining a heated beverage once it is placed onto its mating holding structure.

It is an object of this invention to provide a device which thermally maintains an elevated level of a hot beverage.

Another object of this invention is for the mating holding structure, once connected to an electrical power supply, to provide electricity to the containing and thermally maintaining means.

Yet another object of this invention is for the mating holding structure to provide stability when the containing and thermally maintaining means is placed onto it.

BRIEF DESCRIPTION OF THE DRAWINGS

FIG. 3. is a cross-sectioned, pictorial illustration showing the top view of the covering and thermal regulation means;

FIG. 4. is a cross-sectioned, pictorial illustration showing the top view of the container.

DETAILED DESCRIPTION OF THE EMBODIMENT

Figures 1, 2:
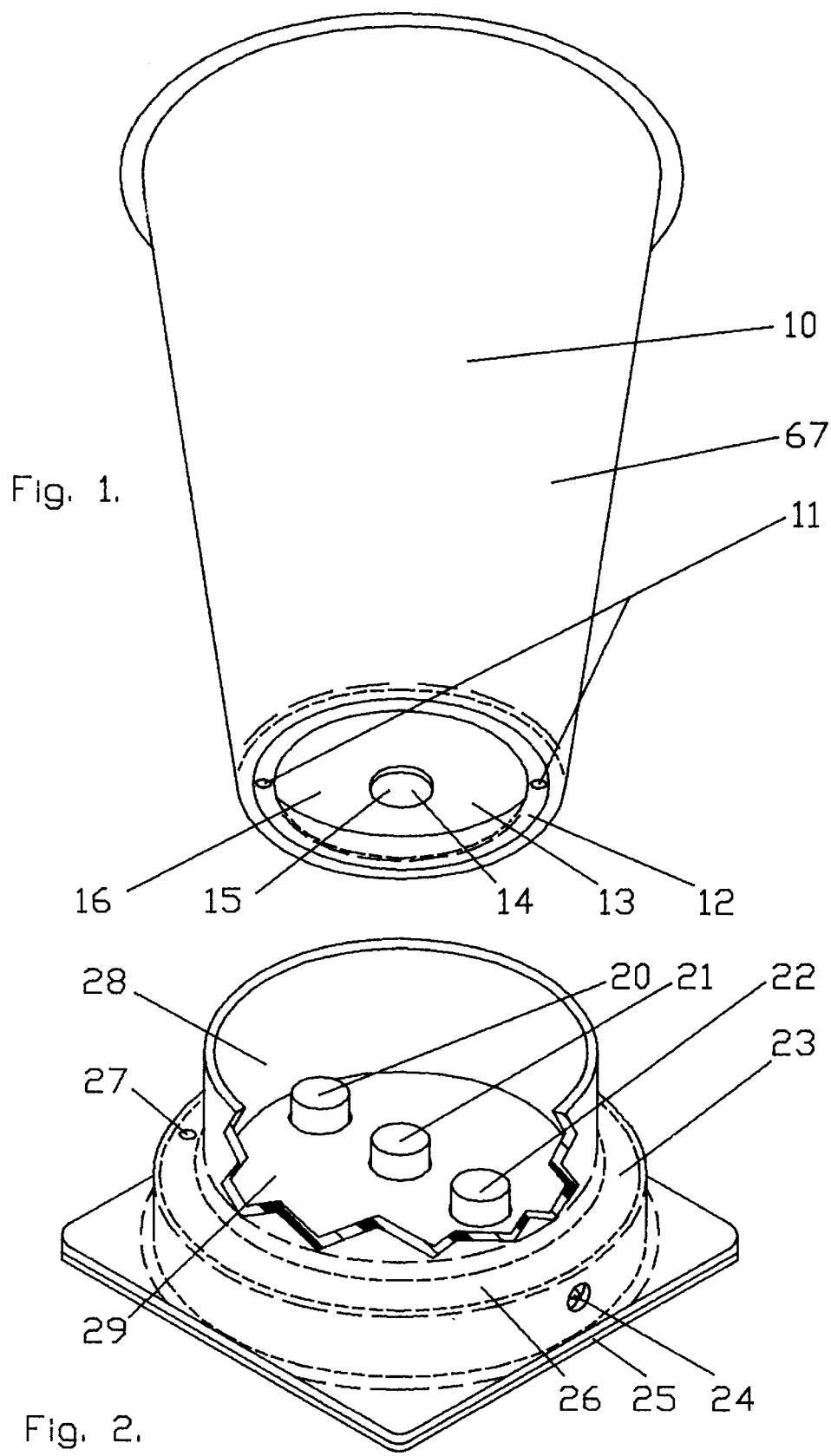
FIG. 1. is a pictorial illustration showing the bottom view of the container.
FIG. 2. is a pictorial illustration showing the top view of the mating holding structure with portions thereof cut-away for illustrative purposes.

Referring now in more detail to FIGS. 1, 2, 3 and 4, an embodiment of an electrically heated beverage appliance is shown. In this embodiment, the electrically heated beverage appliance generally consists of a container (10), mating holding structure (23), and covering and thermal regulation means (47). The container (10) is designed to rest on electrical contacting members (20), (21), and (22) of the mating holding structure (23) and is shown above the mating holding structure in FIG. 1 and also in FIG. 4. The container (10) comprises a containing structure (67), thermally and electrically conductive member (13), heating means (15), retaining member (12), and a sealing member (63). The mating holding structure (23) consists of a holding member (26), electrical contacting members (20), (21), and (22), non-sliding, non-scratching means (25), electrical connecting means (not shown), fastening means (not shown) and elastic members (not shown). The covering and thermal regulation means (47) consists of a lid (40) and valve (42).

The thermally and electrically conductive member (13) in the container (10) is preferably made of thin, solderable metal, such as copper or the like. The thermally and electrically conductive member (13) includes a bottom portion (16) and top portion (61). The bottom portion (16) of the thermally and electrically conductive member (13) has a heating means (15) fastened in electrical contact with it, preferably by means of soldering or the like. In this embodiment, the heating means is shown as a positive temperature coefficient (PTC) thermistor. The heating means, however, can include any type of electrical heater. The heating means (15) is disk-shaped and includes a bottom portion (14) and top portion (62). When electricity is applied to the bottom portion (14) and top portion (62) of the heating means (15), the heating means (15) produces heat. This heat is transferred to the thermally and electrically conductive member (13) and then to the beverage collected within the container (10). The bottom portion (16) of the thermally and electrically conductive member (13) is part of an electrical circuit used to conduct electricity from the electrical contacting member (20) in the mating holding structure (23) to the top portion (62) of the heating means (15). When the container (10) is placed onto the mating holding structure (23), electrical contacting members (20) and (21) complete the electrical circuit required to power the heating means (15). Electrical contacting member (21) in the mating holding structure (23) directly touches the bottom portion (14) of the heating means (15). The electrical contacting member (22), through the thermally and electrically conductive member (13) and electrical contacting member (20), completes another electrical circuit. This circuit illuminates an indicating means (27) in the mating holding structure (23), telling the user the container (10) is properly positioned onto the mating holding structure (23) and is heating the beverage. Another indicating means (not shown) displays a "power on" condition when electricity is supplied to the mating holding structure (23).

The thermally and electrically conductive member (13) is positioned between a containing structure (67) and retaining member (12), forming the bottom boundary of the container (10). In this embodiment, both containing structure (67) and retaining member (12) are made of rigid, high temperature, non-toxic, and electrically non-conductive plastic. A sealing member (63), located between the thermally and electrically conductive member (13) and containing structure (67), is compressed forming a seal so a beverage can be retained within the container (10). The sealing member (63) is housed in a recess (64) at bottom portion of the containing structure (67). The containing structure (67) consists of a thin wall section (60) that extends downwardly at an angle from the annular lip (68) at the open top portion of the container (10), forming the outer boundary of the container (10). The external shape of the container (10) matches a similar shape in the mating holding structure (23). The physical contact caused by this match ensures proper electrical contact alignment and prevents accidental tipping of the container (10). The containing structure (67) also includes an internal thread (65) at the bottom open portion of the container (10) which mates to the external thread (66) of the retaining member (12). The retaining member (12) is assembled to the bottom portion of the containing structure (67) by means of a drive tool. In this embodiment, the tool utilizes recessed holes (11) to complete its function.

The lid (40) of the covering and thermal regulation means (47) in FIG. 3. has a groove (46) that seals against the annular lip (68) of the container (10). The valve (42) has a sealing face (43) which is semi-circular and flat. Both lid (40) and valve (42) are made of plastic. A knob (50) and annular, flexible, locking tab (48) extend upwardly from the midsection of the sealing face (43) and snaps into a hole (44) in the middle of the lid (40). The user controls the temperature of the beverage by rotating the knob (50) on the valve (42) which exposes or seals ventilation holes (45), thereby dissipating or retaining some heat stored in the beverage. An air vent hole (49), separate from the ventilation holes (45), allows air to enter and escape the cavity of the container (10) so the beverage flows freely. The user drinks the beverage through the opening (41) in the covering and thermal regulation means (47).

The top of the mating holding structure (23) has an opening to accept the bottom portion of the container (10). The holding member (26) has a downwardly extending, angular wall (28) that keeps the container (10) from accidentally tipping. A landing (29) at the foot of the wall (28) keeps the container (10) at the proper height with respect to the mating holding structure (23) to make electrical contact. The landing (29) also aligns and guides the electrical contacting members (20), (21), and (22). Elastic members (not shown) are part of an electrical circuit, and are positioned between each electrical contacting member (20), (21), and (22) and an electrically connecting means (not shown). For a clearer understanding of this embodiment, the elastic members could be compression springs, and the electrically connecting means could be a printed circuit board. The electrically connecting means comprises a power jack (24), two indicating means—"heat" mode (27) and "power on" mode (not shown), and a self-resettable fuse (not shown). The electrically connecting means is attached by fastening means to the bottom side of the holding member (26). The holding member (26) has a square footprint to aid in stabilizing the electrically heated beverage appliance (5) and (6). A non-sliding and non-scratching means (25) is affixed to the bottom of the holding member (26). Electricity is supplied to the mating holding structure (23) through a power cord assembly (not shown) using known connector means that are associated with household and automative outlets—comprising electrical transformers and power supplies, automotive electrical systems—such as cigarette lighter adapters, and other electrical power sources.

Considering now the operation of the disclosed embodiment, a desired hot beverage, such as coffee, is poured into the container (10). The container (10) is then placed onto the mating holding structure (23), and electricity is supplied to the heating means (15) through a power cord assembly (not shown) in conjunction with an electrically connecting means (not shown), elastic members (not shown), electrical contacting members (20) and (21), and a thermally and electrically conductive member (13). Heat from the heating means (15) is applied to the bottom surface (16) of the thermally and electrically conductive member (13), quickly passes through the thermally and electrically conductive member (13), and dissipates upwardly to thermally maintain the beverage previously placed in the container (10). The heating means (15) could be self-regulating and self-limiting, and should be selected to sufficiently maintain the desired consumption temperature of the hot beverage. A covering and thermal regulation means (47) comprising a lid (40) and valve (42) accompanies the electrically heated beverage appliance to prevent spilling of the beverage and deter heat dissipation. Additionally, if desired, the covering and thermal regulation means (47) can also thermally regulate the hot beverage. By rotating the valve (42) and controlling the quantity of exposed ventilation holes (45), the user can adjust the maintained beverage temperature.

Although one detailed embodiment of the invention is illustrated in the drawings and previously described in detail, this invention contemplates any configuration, material, design and relationship of components which will function in a similar manner and which will provide the equivalent result. All embodiments of this invention would function to electrically maintain an elevated level of a hot beverage.

What is claimed is:

1. An apparatus for thermally maintaining a beverage, comprising:

(a) a container constructed and arranged to store and thermally maintain the beverage, comprising
      (i) a containing structure having a lateral wall constructed and arranged to laterally contain the beverage, the lateral wall having upper and lower portions,
      (ii) a conductive member having upper and lower surfaces and disposed adjacent to the lower portion of the lateral wall, thereby providing a bottom wall for containing the beverage,
      (iii) an electric heater, thermally and electrically coupled to the lower surface of the conductive member, constructed and arranged to generate heat using electric energy,
         wherein the conductive member is constructed and arranged to conduct heat to its upper surface from the heater and to conduct electrical energy to the heater, and
      (iv) a sealing member constructed and arranged to provide a seal between the conductive member and the lower portion of the lateral wall of the containing structure; and
   b) a mating holding structure constructed and arranged to hold, and provide electric energy to, the container.

2. The apparatus of claim 1, wherein:
   the container further comprises
      (v) a retaining member constructed and arranged to compress and retain the sealing member against the lower portion of the lateral wall of the containing structure.

3. The apparatus of claim 2, wherein:
   the outer perimeter of the retaining member is threaded, and the lower portion of the lateral wall of the containing structure includes a recess for accepting the sealing member and threads for receiving the retaining member and for tightening the retaining member against a bottom surface of the sealing member.

4. The apparatus of claim 1, wherein:

the electric heater comprises a positive temperature coefficient thermistor.

5. The apparatus of claim 1, wherein:

the electric heater is self-regulating.

6. The apparatus of claim 1, wherein:

the electric heater is generally disk-shaped.

7. The apparatus of claim 1, wherein:

the electric heater is soldered to the lower surface of the conductive member.

8. The apparatus of claim 1, wherein:

the mating holding structure comprises
- (i) a first contacting member constructed and arranged to conduct electric current to or from a lower surface of the electric heater,
- (ii) a second contacting member constructed and arranged to conduct electric current to or from the lower surface of the conductive member, and
- (iii) a holding member constructed and arranged to align the container so that the first contacting member makes electrical contact with the lower surface of the electric heater, and the second contacting member makes electrical contact with the lower surface of the conductive member, when the container is placed in the mating holding structure.

9. The apparatus of claim 8, wherein:

the mating holding structure further comprises
- (i) a positioning indicator constructed and arranged to provide an indication to a user indicating that the container is properly positioned in the mating holding structure, and
- (ii) a third contacting member, electrically coupled to the positioning indicator and constructed and arranged to conduct electric current to or from a lower surface of the conductive member, and further wherein the holding member further is constructed and arranged to align the container so that the third contacting member makes electrical contact with the lower surface of the conductive member when the container is placed in the mating holding structure.

10. The apparatus of claim 1, wherein:

the container further comprises
- (iv) a lid that, when in use, is disposed against the upper portion of the lateral wall of the containing structure, thereby providing a top wall for containing the beverage.

11. The apparatus of claim 10, wherein:

the lid has an annular groove constructed and arranged for mating and sealing the lid with the upper portion of the lateral wall of the containing structure.

12. The apparatus of claim 10, wherein:

the lid has an opening for drinking and one or more ventilation holes.

13. The apparatus of claim 12, wherein:

the lid has a valve constructed and arranged to selectively block at least one of the one or more ventilation holes.

\* \* \* \* \*